US012293002B2

(12) United States Patent
Li et al.

(10) Patent No.: US 12,293,002 B2
(45) Date of Patent: May 6, 2025

(54) SECURITY DATA STORAGE SYSTEMS

(71) Applicant: Anzen Technology Systems Limited, Brighton (GB)

(72) Inventors: Hoon-Ywen Li, London (GB); Charlie Sillitoe Brown, Carnforth (GB); Achim D. Brucker, Exeter (GB)

(73) Assignee: Anzen Technology Systems Limited, Brighton (GB)

( * ) Notice: Subject to any disclaimer, the term of this patent is extended or adjusted under 35 U.S.C. 154(b) by 334 days.

(21) Appl. No.: 18/077,323

(22) Filed: Dec. 8, 2022

(65) Prior Publication Data

US 2023/0185965 A1 Jun. 15, 2023

Related U.S. Application Data

(60) Provisional application No. 63/287,587, filed on Dec. 9, 2021.

(51) Int. Cl.
| | | |
|---|---|---|
| *G06F 21/00* | (2013.01) | |
| *G06F 16/22* | (2019.01) | |
| *G06F 16/23* | (2019.01) | |
| *G06F 16/2458* | (2019.01) | |
| *G06F 16/28* | (2019.01) | |
| *G06F 21/62* | (2013.01) | |

(52) U.S. Cl.
CPC ...... *G06F 21/6254* (2013.01); *G06F 16/2228* (2019.01); *G06F 16/2379* (2019.01); *G06F 16/2471* (2019.01); *G06F 16/285* (2019.01)

(58) Field of Classification Search
CPC ............. G06F 16/2228; G06F 16/2379; G06F 16/2471; G06F 16/285; G06F 21/6254
USPC ........................................................ 707/736
See application file for complete search history.

(56) References Cited

U.S. PATENT DOCUMENTS

| | | | |
|---|---|---|---|
| 8,418,055 B2 * | 4/2013 | King | G06V 30/224 707/711 |
| 2011/0307486 A1 | 12/2011 | Breslau | |
| 2014/0189858 A1 | 7/2014 | Chen | |

* cited by examiner

*Primary Examiner* — Vincent F Boccio
(74) *Attorney, Agent, or Firm* — Loginov & Associates, PLLC; William A. Loginov

(57) ABSTRACT

A method and system for the storage of data in compliance with territorial privacy laws while retaining data sovereignty. The method generally comprises splitting input data into clusters and anonymising the clustered data. Information relating to the anonymised data clusters may then be split and stored separately in data shards. The anonymization and splitting of the data prevents the restoration of the input data without access to all of the data shards. Also a method and system for decoding data anonymised by the method.

20 Claims, 4 Drawing Sheets

SECURITY DATA STORAGE SYSTEMS

RELATED APPLICATION

This application claims the benefit of U.S. Provisional Application Ser. No. 63/287,587, entitled SECURITY DATA STORAGE SYSTEMS, filed Dec. 9, 2021, the teachings of which are expressly incorporated herein by reference.

FIELD OF THE INVENTION

This specification relates to systems for storage of private information in the cloud without contravention of territorial privacy laws.

BACKGROUND

Legal requirements for protection of personal data mean that in many countries restrictions are imposed on where such information can be stored. Even if the content is encrypted many data protection laws prevent such information from being is transferred out of the country, and the risk of increasingly advanced algorithms or leakage of passwords or encryption keys means that information may ultimately be leaked and become accessible. Further, cloud storage and processing providers typically may distribute or migrate content across multiple geographic sites as a form or redundancy or to assist with load balancing. Even if personal content is uploaded to a cloud in a local territory, backups may be made to other clouds throughout the world. Background technology is described in U.S. Pat. No. 9,202,085, US2011/0307486, and US2014/0189858.

There is a general need for increasing data security whilst retaining data sovereignty.

SUMMARY

This specification generally relates to systems for anonymising input data, in particular personal information, so that information can more easily be stored remotely e.g. whilst still meeting requirements for protection of personal data. The systems may be implemented by one or more computers in one or more locations.

In one aspect there is described a method, and corresponding system, for anonymising (and storing a representation of) an input data item. The method steps described below may be implemented by a system configured to perform the method.

Thus the method may comprise obtaining a set of data points, wherein each data point is defined by a numeric value, and wherein the set of data points defines a representation of the input data item. The method may also assign an index value to each of the plurality of data points, the index value representing a position of the data point in the representation of the input data item. That is, the data points may have a sequence and the index value may represent a position in the sequence, to facilitate reconstruction of the data item on retrieval.

The method may further comprise clustering the data points into one or more clusters, determining a deviation of each data point from a reference data point of its respective cluster. The method may involve generating a unique identification for each data point. This may uniquely identify a data point within a cluster or within all the one or more clusters.

The method may further comprise generating one or more entries for a translation table mapping the unique identification for each data point to the corresponding index value. The method may further comprise generating one or more entries for a deviation table mapping the unique identification for each data point to the corresponding deviation. The method may further comprise generating one or more entries for a cluster table mapping the unique identification for each data point to its corresponding cluster. The method may further comprise generating one or more entries for a reference table comprising the reference data points of each of the one or more clusters. In implementations the reference table maps the reference data points to the corresponding unique identification.

The method may then comprise storing the one or more entries for the translation, deviation, cluster and reference tables, in this way storing a representation of the input data item which can be used to reconstruct the data item.

Implementations of this method combine a high degree of data security with data anonymity, and make it very difficult to reverse engineer a data item from the partial knowledge in just one or some of the tables. In particular implementations of the method achieve this whilst still facilitating rapid, e.g. real-time, data retrieval.

The approach also facilitates secure storage of data using commercial cloud storage such as Amazon Web Services®, Microsoft Azure®, Oracle Cloud® storage and the like. Nonetheless in some alternative implementations of the method two or more of the tables e.g. the cluster table and the reference table, may be combined into a single, combined table at the expense of reduced security.

In some implementations the method comprises storing one or more of the translation, deviation, cluster and reference tables remotely from the other tables. In particular each of the tables may be stored in a storage system e.g. database that is geographically separated from a storage system storing one or more of the other tables. The storage systems may be connected via a WAN (Wide Area Network). This can facilitate increased security, by dividing the tables amongst different actors.

Optionally data retrieved from one or more of the storage systems, such as part of each table, may be temporarily cached e.g. in non-persistent, working memory (rather than persistent, non-volatile memory) for faster reconstruction of a retrieved data item. The storage systems, however, may comprise persistent data stores.

In some implementations a data item is a file, which is treated as a set of numeric values each defining one of the data points. Each numeric value may be defined by a one byte or multi-byte representation. Optionally a file may be padded to a multi-byte boundary.

Thus in some implementations of the method a file may be viewed as a sequence of numbers, irrespective of what these numbers might represent in the context of the file. In such implementations a separate set of clusters may defined for each file. In such an implementation, generating and storing the one or more entries for the translation, deviation, cluster and reference tables may comprise generating and storing a complete table for each of the translation, deviation, cluster and reference tables. That is each data item may generate a complete set of tables, which are stored and which may later be accessed to retrieve the data item.

In some other implementations rather than generating and storing complete tables, a data item is used to generate one or more entries for each of the tables. These may then be inserted into the tables. In such implementations (physically/geographically separate) data stores storing the respective tables may each comprise a (physically/geographically separate) database, and storing the one or more entries for the translation, deviation, cluster and reference tables may comprise updating a database entry for each respective table in a respective (physically/geographically separate) database.

For example, in some implementations the input data item may be a data item from a input database, where each column of the input database defines a data type for the data item. Then clusters for data items may be defined according to the data type. Data items having the same data type may be used to define the (set of) one or more clusters into which the data points are clustered. This approach may also be used when data items have different, defined data types outside the context of a database, e.g. when a data item may have a numeric data item type or a string data item type.

In implementations prior to uploading to a data store, entries or tables for a data item, such as a file to be stored, may undergo further processing to facilitate retrieval. For example one or more of the tables representing a data item may be serialised e.g. into a Concise Binary Object Representation (CBOR), and/or compressed e.g. using a lossless compression process such as Snappy.

In some implementations each numeric value may comprise an integer representation of the numeric value e.g. a multi-byte integer representation such as an 8-byte (64 bit) integer representation.

In some implementations the numeric value representation is a floating point value representation e.g. of a double precision floating point value. Then a correction value may also be stored e.g. in the translation table, to compensate for any floating-point math errors during calculation of the deviation. Where the multi-byte representation is a floating point value the method may include splitting the input data item into groups of 7 bytes, inserting a leading empty byte into each of the groups, and evaluating the groups as the floating point value.

In some implementations, in particular where the numeric value representation is a floating point value representation, the data points are clustered using k-means clustering.

However, surprisingly, it has been found that random clustering i.e. randomly grouping the data points into clusters, can work as well or better but with reduced computational overhead, in particular where the numeric value representation is a floating point value representation. In some implementations the clusters may be clusters in one dimension i.e. determining the reference data point e.g. a centroid or means of a cluster, may comprise determining a single numeric value. Thus in implementations determining the reference data points for the one or more clusters may comprise determining a set of random values. Mapping the data points to the clusters may then comprise allocating the data points to (appropriately sized) bins with locations between, and defined by, the means of the clusters. Using random clustering of this type is computationally efficient whilst still preserving the security advantages of using four different types of table as defined above.

In some implementations entries in one or more of the translation, deviation, cluster and reference tables may be processed to increase an entropy of the data before storing the entries. This can mitigate a frequency analysis attack based on monitoring data outputs from the tables. Conveniently this may be done by encrypting the entries prior to storing, e.g. using AES (Advanced Encryption Standard) encryption. Optionally the method may further comprise encrypting the input data item prior to generating the data points.

The index value for each data point may be stored in the translation table. Optionally the method may further comprise shuffling the data item after assigning the index value to each of the plurality of data points i.e. randomly changing an order of the data points of the data item. A Fisher—Yates shuffle may be used.

There is also described a method of recovering an input data item anonymised and stored as described above. The method may comprise retrieving the one or more entries for the translation, deviation, cluster and reference tables, calculating the numeric value of each data point based on at least the deviation of the data point and the numeric value of the reference data point of its respective cluster, and restoring the input data item based on the at least the index value of each data point.

In some applications the method is used in the context of a mesh network connecting multiple different devices e.g. in a facility monitoring or automation, or a traffic monitoring or control setting. Then the translation, deviation, cluster and reference tables may be stored in different devices connected to the mesh network. Optionally one or more of the tables may be replicated amongst the devices for fault tolerance. In some implementations a mapping is maintained defining which table is allocated to which device(s); this may be maintained by one or more controller nodes of the mesh network.

In another aspect there is described a method of recovering an anonymised data item, where the data item is represented by a set of data points, each data point being defined by a numeric value.

The method may comprise retrieving a translation table/data from a translation table mapping a unique identification for each data point to a corresponding index value, the index value representing a position of the data point in the data item.

The method may further comprise retrieving a cluster table/data a cluster table from a cluster table mapping the unique identification for each data point to a corresponding cluster. The method may further comprise retrieving a reference table/data from a reference table comprising reference data points of the corresponding cluster, the reference table mapping the reference data points to the corresponding unique identification. The method may further comprise retrieving a deviation table/data from a deviation table mapping the unique identification for each data point to a corresponding deviation of the data point from the reference data points of the corresponding cluster.

The method may further comprise calculating the numeric value of each data point based on at least the deviation of the data point and the numeric value of the reference data point of its respective cluster, and restoring the data item based on the at least the index value of each data point.

The method may include removing a leading empty byte from each of the data points. Retrieving data from the translation, deviation, cluster and reference tables may include comprises decrypting the data from the translation, deviation, cluster and reference tables In some implementations the numeric value is a floating point value e.g. a double precision floating point value. The reference table may include a mapping between the unique identification for each data point and a correction value, the correction value correcting for errors in the deviation. Calculating the numeric value for each data point may also use the correction value to make a correction to the numeric value.

In another aspect there is described a database management system for storing an anonymised data item. In implementations the system comprises a plurality of data stores for storing one or more data entries, one or more processing device, and one or more non-transitory computer-readable media connected to the processing device configured to store instructions that, when executed by the processing device, performs operations for storing the anonymised data item.

The operations may comprise obtaining a set of data points, wherein each data point is defined by a numeric value, wherein the set of data points defines a representation of the data item.

The operations may further comprise assigning an index value to each of the plurality of data points, the index value representing a position of the data point in the representation of the input data item.

The operations may further comprise clustering the data points into one or more clusters. The operations may further comprise determining a deviation of each data point from a reference data point of its respective cluster. The operations may further comprise generating a unique identification for each data point. The operations may further comprise generating one or more entries for a translation table mapping the unique identification for each data point to the corresponding index value. The operations may further comprise generating one or more entries for a deviation table mapping the unique identification for each data point to the corresponding deviation. The operations may further comprise generating one or more entries for a cluster table mapping the unique identification for each data point to its corresponding cluster. The operations may further comprise generating one or more entries for a reference table comprising the reference data points of each of the one or more clusters, the reference table mapping the reference data points to the corresponding unique identification. The operations may further comprise storing the one or more entries for the translation, deviation, cluster and reference tables on the plurality of data stores.

The plurality of data stores may be connected in a mesh network, as previously described.

There is also provided computer program code (instructions), e.g. stored on one or more computer readable media, and configured to control one or more computers to implement the systems and methods described above. The code (computer program) may be provided on a non-transitory data carrier e.g. on one or more physical data carriers such as a disk or programmed memory such as non-volatile memory (e.g. Flash) or read-only memory (Firmware). Code and/or data to implement examples of the system/method may comprise source, object or executable code in a conventional programming language, interpreted or compiled), such as C, or assembly code, or code for a hardware description language. The code and/or data to implement the systems may be distributed between a plurality of coupled components in communication with one another.

BRIEF DESCRIPTION OF THE DRAWINGS

Embodiments of the invention are described herein with reference to the attached drawings. It will be understood that these embodiments are merely examples.

DETAILED DESCRIPTION OF THE EMBODIMENTS

This specification describes a scheme by which data items may be securely stored. The methods described herein allow data items to be stored on a public cloud whilst increasing data security and retaining data sovereignty. The scheme addresses the fundamental issues of storage of data and the legal mechanics of data separation, dispersal, and subsequent reassembly of the data into a meaningful view to an authorized person. As a result, the methods are particularly advantageous for the storage of highly sensitive or classified data.

The data item or original file may be any type of data, including but not limited to a database, strings, text documents, image files, video files and/or audio files.

In general, the process operates by pseudonymising or obfuscating data from an input data item. The anonymized data is split up into individual data shards. The data shards may located anywhere and may therefore be distributed globally. As long as at least one data shard is within the home territory, the whole dataset will be data sovereignty and jurisdiction compliant. Moreover, should any given shard be compromised, the data can be re-clustered, rendering the stolen shard useless.

Further layers of encryption for each data shard can also be added as will be described later. In privacy terms each additional layer of security is known as a PET layer—privacy enhancing technology layer.

In this way, the method and system incorporate additional security features and precautions such as multiple levels of non-conventional encryption techniques applied to such coded data prior to transmission both to and from the cloud.

Thus the system provides a mechanism whereby personal data can be stored in the cloud without territorial restriction in terms of privacy and compliance. Within the UK for example, privacy laws regulate the geographical locality of personal information storage. Personal UK financial data under this scheme can be stored legally in the Cloud. It will be appreciated under similar laws in other countries, information may also be stored in the Cloud. Cloud storage is not possible with standard encryption practices as the data is still stored, albeit in encrypted form potentially in non-permitted jurisdictions. Should any unauthorized person obtain access to the encrypted data, circumvention of the password, or password 'cracking' could allow them access to the data and the personal information. By adding the obfuscation and dividing the data as described herein, even with a successful unauthorized access of one or more of the shards, the data is of no value.

Figure 1:
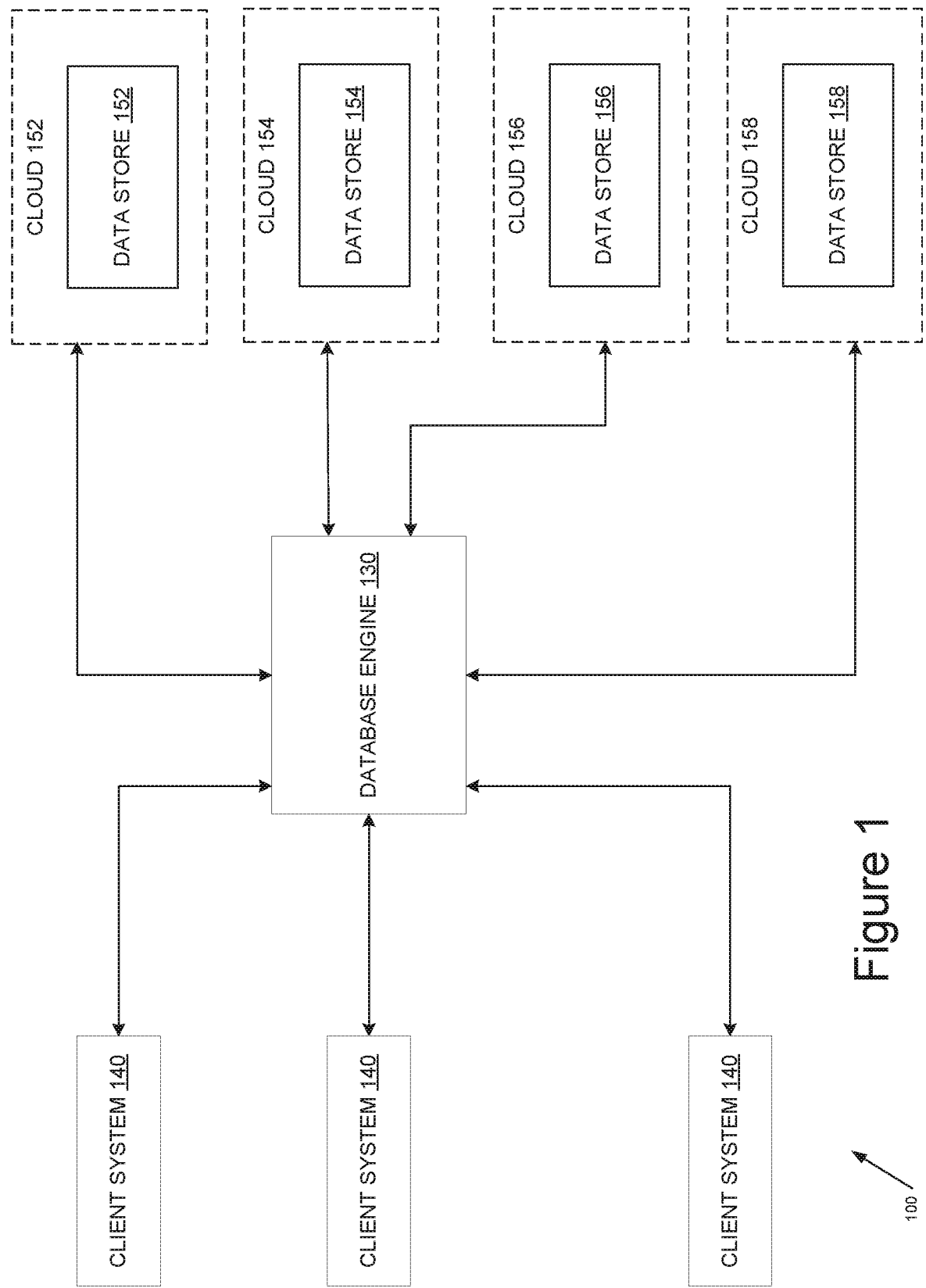
FIG. 1 is a schematic diagram of a system according to an embodiment of the present invention.

FIG. 1 shows a database management system 100 according to one embodiment of the invention. The system comprises a database engine 130, one or more client systems 140 and one or more cloud data stores 152, 154, 156 and 158. Database engine 130 may receive one or more data items from client systems 140, anonymize the data, split the data into data shards and then store the data shards on one or more of cloud data stores 152, 154, 156 and 158. In some embodiments, each data shard may be stored in a separate data store. Alternatively, multiple data shards may be stored in the same data store. Further details on the processes performed by the data engine is provided with reference to FIG. 2 below.

Alternatively or in addition to the above, system 100 may be used to recover anonymized data. In order to restore the anonymized data item, database engine 130 may receive the stored data shards from data stores 152, 154, 156 and 158. Database engine 130 may then combine the data shards and restore the original data item. The original data item may then be provided to the one or more authorized client systems 140. Further details on this process are provided with reference to FIG. 4 below.

Figure 2:
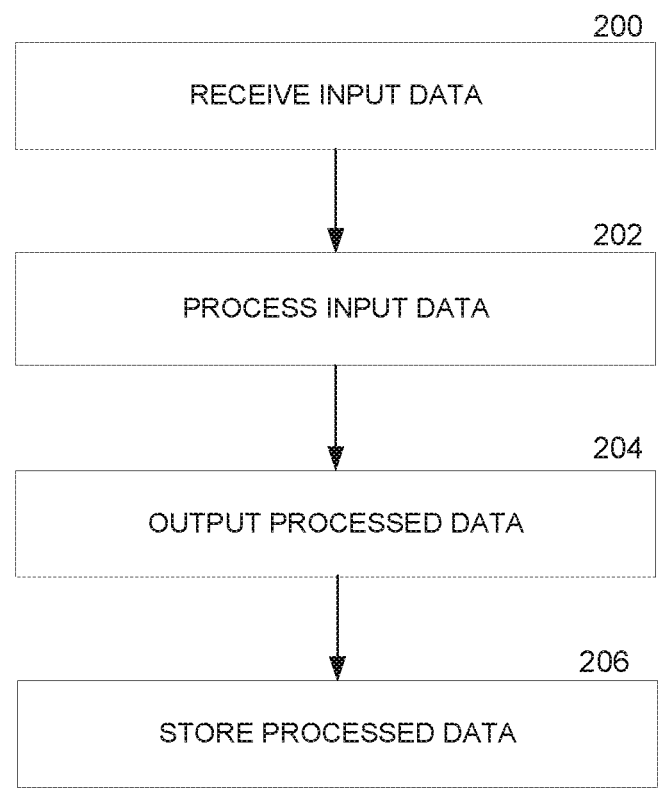
FIG. 2 is a flow diagram of a method for anonymizing input data items according to an embodiment of the present invention.

FIG. 2 is a flow diagram showing a method for anonymizing and storing a data item. At step 200, an original file is received. The data item or original file may be any type of data, including but not limited to a database, strings, text documents, image files, video files and/or audio files, and may comprise sensitive or classified data. If the data item may be encrypted during transfer process, receiving the data item may include decrypting the received input data. Optionally, the data item may be encrypted, for example using AES encryption, prior to processing the data in step 202.

After receiving the input data item, the input data is processed in step 202. The data item may first be represented as a series of numerical values. In some embodiments, the numerical values may be integer values. Alternatively, the numerical values may be floating point values, such as double-precision floating point values. In embodiments utilizing floating point values, this step may comprise splitting the input data into chunks of 7 bytes, and padding the chunks with a leading empty byte. An example of this process is shown below:

Input.: 13 FA F7 27 4F 2E D7
Output.: 00 13 FA F7 27 4F 2E D7

The output chunk of 8 bytes may then be evaluated as a double-precision floating point number.

Alternatively, the input data may be represented in binary strings. Beneficially, this binary representation may support all data types including non-numeric data types (such as strings). Optionally, the binary strings may be converted into numeric representations, such as integer values or floating point values as discussed above. In either case, the process may proceed as described below.

Each numerical value in the input data is assigned an index value representing the position of that value in the input dataset. The index values may form, for example, an incremented index. For example, the first numerical value may be assigned an index value of "0", the second numerical assigned an index value of "1", and so on. It will be understood that any other suitable index may be used in this process.

Optionally, after assigning the index values, the dataset may be shuffled in order to randomize the data points. The numerical values may be shuffled via any one or more methods familiar to the skilled person, for example via a Fisher-Yates algorithm. It will be understood that other suitable algorithms may also be applied to the data points of the data item, either alone or in combination. The shuffling of the datasets may advantageously mitigate vulnerabilities found in many existing methods, such as known value attacks.

The data points of the dataset may then be split into one or more clusters via a clustering process. In some embodiments, this process may be a k-means clustering process. Alternatively, the process may be a random clustering process. Beneficially, random clustering may reduce computational overhead, particularly as some k-means clustering processes require that the numeric value representation is a floating point value rather than an integer value. In one embodiment, the clusters may be one dimensional clusters and the random clustering algorithm may comprise determining a set of random or pseudorandom reference values or reference data points for the clusters. The data points of the data sets may then be allocated to bins based on their numeric values, each bin being centered around a reference value of a corresponding cluster. Therefore, the reference value of each cluster may also be a centre value or centroid of the cluster. In one implementation, the dataset may be clustered into ten one dimensional clusters, however other implementations may comprise more or fewer clusters.

Each cluster may be assigned a cluster identification. This cluster-ID may be a random ID, for example a 32-bit random ID, and may be used to identify a specific cluster out of the one or more clusters. Therefore, each cluster-ID may be a unique identification value.

After assigning the data points of the input data item to the clusters, a deviation value, also called a delta value, may be calculated. The deviation value of a data point represents a difference or delta between the numerical value of the data point and the reference value of its associated cluster. Where the numerical value is a double-precision floating point value, the method may further comprise the calculation of a correction value to correct for errors in floating point calculations.

Following this calculation, each data point of the input data has an associated index value, numerical value, cluster-ID and deviation value. As discussed above, in some embodiments each data item may also have an associated correction value. In addition, each data point may be assigned a unique identification. This unique-ID may be a random ID, for example a random 32-bit ID, which may be used to uniquely identify each data point. This unique-ID may be stored alongside each of the associated components to facilitate restoration.

Each cluster is then output as a collection of data shards in step 204. In some implementations, the cluster outputs may be split into data shards corresponding to data entries for cluster tables, deviation tables (or delta tables), translation tables and reference tables. In an example embodiment, the data entries for the cluster table may map the unique-ID of each data point to the corresponding cluster-ID. The data entries for the deviation table may map the unique-ID of each data point to its corresponding deviation value. The data entries of the reference table may map the cluster-ID of each cluster to the corresponding reference value of the cluster. Finally, the data entries for the translation table may map the unique-ID of each data point to its associated index value. The data entries of the translation table may also map the unique-ID of each data point to the associated correction value.

In order to restore the original data item, an attacker must acquire at least the index value, deviation value, reference value and cluster-ID for each data point. Therefore, any two or more of the data entries for each data point may be combined into a single data entry. For example, the data output may comprise two data shards, with one data shard corresponding to data entries for the cluster and deviation tables and the second data shard corresponding to data entries for the reference and translation tables. It will be understood that other combinations of the data entries are also possible. Beneficially, this may reduce computational requirements for storing the output data and later reassembling the original data item, but at the cost of decreased security for the stored data.

In some embodiments, data shards may be generated for each cluster. Alternatively, the output data shards may contain data entries relating to all of the one or more clusters.

In step 206, the processed data may be stored in one or more data stores. Each data shard may be stored in a separate data store. Alternatively, one or more data shards may be stored in the same data store. The data stores may be cloud based data stores. In some embodiments, each data store may be geographically separated from the other data stores. For example, the output data shards may be stored in cloud storage based in London, San Francisco, Sydney and Tokyo. Advantageously, storing the output data shards in multiple countries enables data sovereignty to be maintained.

As long as at least one of the data shards is stored within the home territory, the whole dataset will be data sovereignty and jurisdiction compliant. Optionally, this storage process may further comprise serializing, compressing and encrypting the output data shards. The serialization may use CBOR, or any other suitable format. Similarly, the compression process may use snappy, or any other suitable compression library. The encryption may be AES encryption, or any other suitable encryption method.

Alternatively, the output data shards may be combined with existing data shards containing the same data entries. For example, the output data shards may be inserted into existing cluster, deviation, translation and reference tables which additionally contain data entries corresponding to unrelated data items.

In another example, the output data shards may be stored in a mesh network, wherein each node in the mesh network is a data store. The mesh network may be, for example, an internal business network accessible only to employees of that business.

In this implementation, multiple copies of each data shard may be stored within the network to protect against unexpected data loss, and an orchestration module may be used to control the storage of each data shard in order to ensure sufficient redundancy and maintain a record of the location of each data shard. The internally stored data shards may later be egressed to a cloud storage as described above, if desired.

Figure 3:
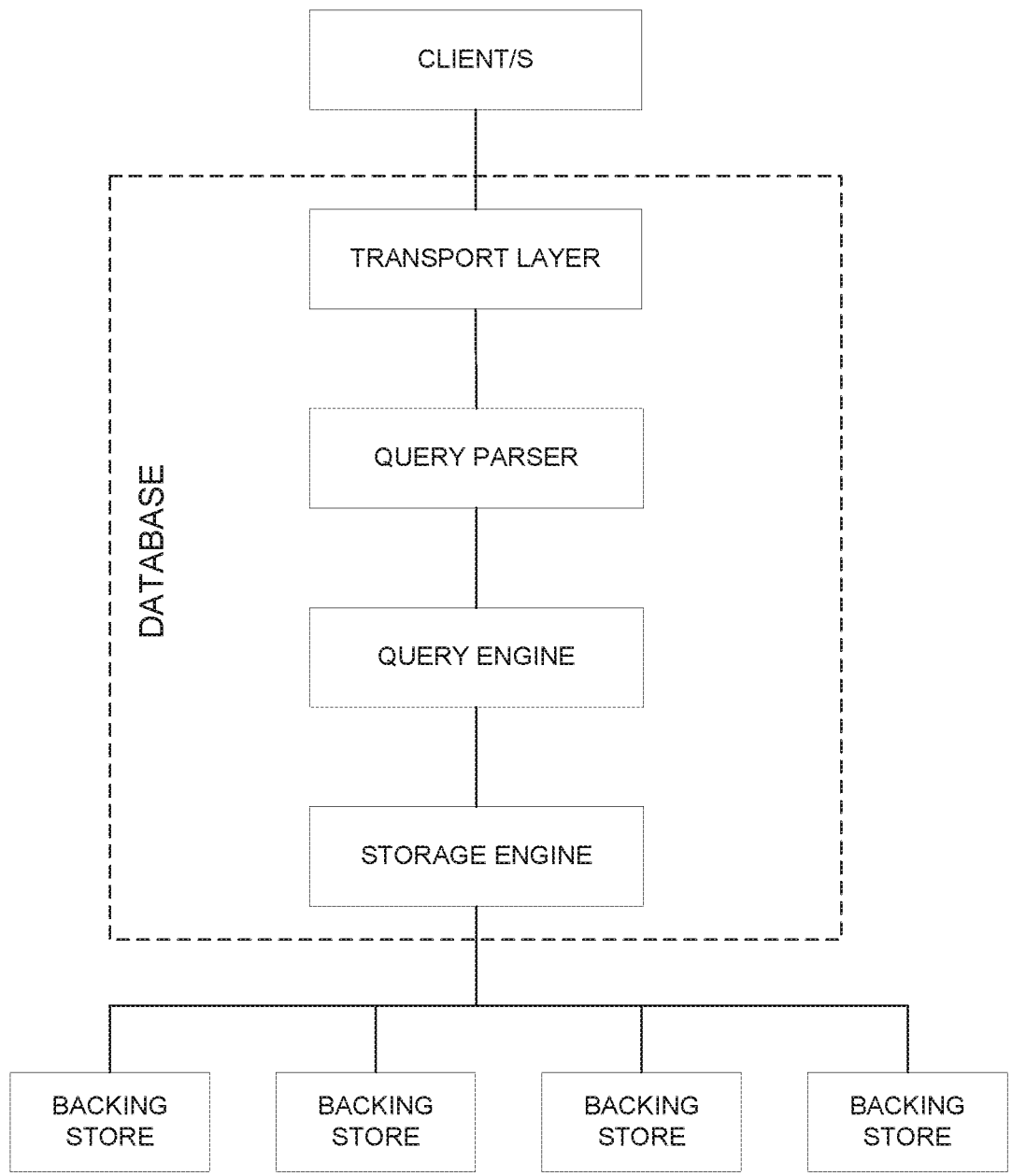
FIG. 3 is a schematic diagram of a database engine according to an embodiment of the present invention.

FIG. 3 shows an example database engine that may be used to perform the methods described herein. The database engine may comprise a transport layer, a query parser, a query engine and a storage engine. The transport layer may be configured to receive queries from a client and to return the results of the query to the client. The query parser may perform validation of the query and break down the input query into its constituent parts. The query engine may then use these make the necessary requests to the storage engine based on the results from the query engine. Finally, the storage engine may then perform the necessary processes to store input data or recover previously stored data, based on the request from the query engine. The transport layer of the database engine may comprise a connection to one or more clients, while the storage engine may comprise a connection to one or more backing storage databases.

Figure 4:
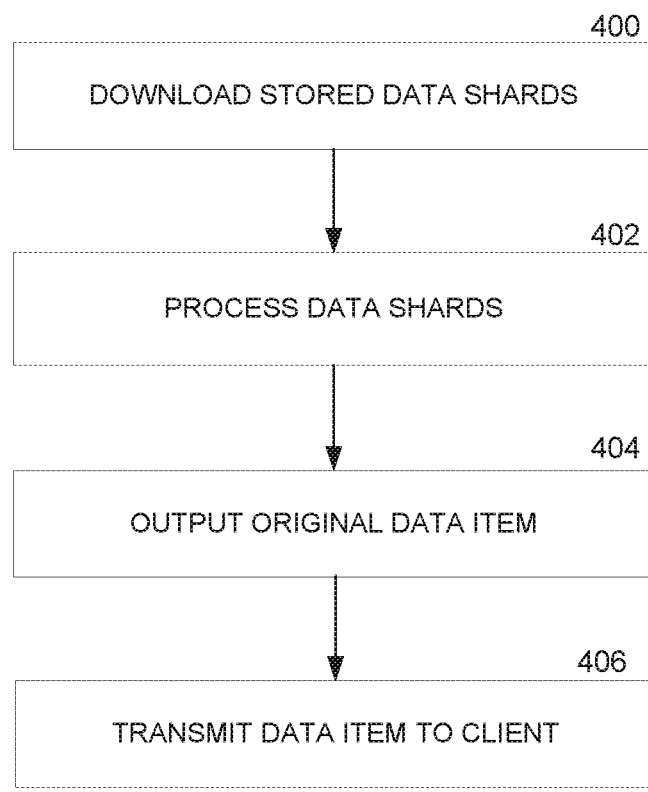
FIG. 4 is a flow diagram of a method for recovering data items anonymized according to an embodiment of the present invention.

FIG. 4 is a flow diagram showing an example process for recovering anonymized data item stored according to the process described above. In general, the restoration of the original data item requires reversing the steps of the storage process. In step 400, in response to a query from an authorized client, the stored data entries are downloaded from the relevant data stores. If the data entries have been encrypted, compressed and/or serialized, this step may further comprise decrypting, decompressing and deserializing the data entries.

In step 402, the data entries for the cluster, translation and deviation tables are joined. The data entries may be merged by using the unique-ID of each data point as a reference. The numerical value of each data point may then be calculated by using the looking up the reference value for the corresponding cluster (as stored in the reference table), and calculating the numerical value for each data point using the reference value and the deviation value of the data point. In some embodiments, a correction value may also be used in the calculation in order to correct for errors in floating point calculations.

In step 404, the numerical values may be combined using the index values to restore the original data item. In some implementations, this may include removing a leading empty byte from each chunk of 8 bytes in order to restore the original item.

Finally, in step 406, the original data item is returned to the client.

It should be understood that the embodiments listed above are not exhaustive and that features from one embodiment may be combined with those of other embodiments.

Applications of the systems and methods for anonymising an input data item, for storing the data item and recovering the data item from storage, include the storage and recovery of any sensitive and/or personal data, in particular in the cloud in jurisdictions, potentially multiple different jurisdictions, in which control over the data may not be trusted. Other applications include storage and recovery of data in an Internet of Things (IoT) or mesh network application, particularly where the stored data might be sensitive. For example such sensitive data might include data from a medical device, or data from sensors in a factory or plant which might, if known, reveal details of a confidential manufacturing process or plant production; or other personal or sensitive data such as data relating to an individual's driving style, behaviour or home occupancy; or data relating to transport of goods.

Features of the method and system which have been described or depicted herein in combination e.g. in an embodiment, may be implemented separately or in sub-combinations. Features from different embodiments may be combined. Thus each feature disclosed or illustrated in the present specification may be incorporated in the invention, whether alone or in any appropriate combination with any other feature disclosed or illustrated herein. Method steps should not be taken as requiring a particular order e.g. that in which they are described or depicted, unless this is specifically stated. A system may be configured to perform a task by providing processor control code and/or dedicated or programmed hardware e.g. electronic circuitry to implement the task.

Aspects of the method and system have been described in terms of embodiments but these embodiments are illustrative only and the claims are not limited to those embodiments. Those skilled in the art will be able to make modifications and identify alternatives in view of the disclosure which are contemplated as falling within the scope of the claims.

What is claimed is:

1. A method of anonymising an input data item using a processing device, the method comprising:
obtaining a set of data points, wherein each data point is defined by a numeric value, and wherein the set of data points defines a representation of the input data item;
assigning an index value to each of the plurality of data points, the index value representing a position of the data point in the representation of the input data item;

clustering the data points into one or more clusters;
determining a deviation of each data point from a reference data point of its respective cluster;
generating a unique identification for each data point;
generating one or more entries for a translation table mapping the unique identification for each data point to the corresponding index value;
generating one or more entries for a deviation table mapping the unique identification for each data point to the corresponding deviation;
generating one or more entries for a cluster table mapping the unique identification for each data point to its corresponding cluster;
generating one or more entries for a reference table comprising the reference data points of each of the one or more clusters, the reference table mapping the reference data points to the corresponding unique identification; and
storing the one or more entries for the translation, deviation, cluster and reference tables.

2. The method of claim 1, wherein storing the one or more entries for the translation, deviation, cluster and reference tables comprises storing the entries for at least one of the translation, deviation, cluster and reference tables remotely from the entries of the other tables.

3. The method of claim 2, wherein storing at least one of the tables remotely comprises storing at least one of the translation, deviation, cluster and reference tables in a storage system that is geographically separated from one or more storage systems storing the other tables.

4. The method of claim 1, wherein storing the one or more entries for the translation, deviation, cluster and reference tables comprises increasing an entropy of the one or more entries for the translation, deviation, cluster and reference tables prior to storing the one or more entries.

5. The method of claim 1, wherein storing the one or more entries for the translation, deviation, cluster and reference tables comprises inserting the one or more entries into pre-existing translation, deviation, cluster and reference tables.

6. The method of claim 5, wherein the pre-existing translation, deviation, cluster and reference tables comprise data entries for a second data item.

7. The method of claim 1, wherein each of the numeric values is an integer value.

8. The method of claim 1, wherein each of the numeric values is a double precision floating point value, and wherein the translation table further maps between the unique identification for each data point and a correction value, wherein the correction value is a value that corrects for errors in the deviation.

9. The method of claim 8, wherein obtaining the set of data points comprises:
splitting the input data item into groups of 7 bytes;
inserting a leading empty byte into each of the groups; and
evaluating the groups as the double precision floating point value.

10. The method of claim 1, further comprising encrypting the input data item prior to generating the data points.

11. The method of claim 1, wherein clustering the data points utilises random clustering.

12. The method of claim 1, wherein clustering the data points utilises k-means clustering.

13. The method of claim 1, wherein the one or more clusters are one dimensional clusters.

14. The method of claim 1, further comprising shuffling the data item after assigning the index value to each of the plurality of data points.

15. The method of claim 1, wherein storing the one or more entries for the translation, deviation, cluster and reference tables comprises at least one of:
(i) serialisation; and
(ii) compression.

16. A method of recovering an anonymised data item from a computing device memory using a processing device, wherein the data item is represented by a set of data points, each data point being defined by a numeric value, the method comprising:
retrieving data from a translation table mapping a unique identification for each data point to a corresponding index value, the index value representing a position of the data point in the data item;
retrieving data from a cluster table mapping the unique identification for each data point to a corresponding cluster;
retrieving data from a reference table comprising reference data points of the corresponding cluster, the reference table mapping the reference data points to the corresponding unique identification;
retrieving data from a deviation table mapping the unique identification for each data point to a corresponding deviation of the data point from the reference data points of the corresponding cluster;
calculating the numeric value of each data point based on at least the deviation of the data point and the numeric value of the reference data point of its respective cluster;
restoring the data item based on the at least the index value of each data point.

17. The method of claim 16, wherein the reference table further comprises a mapping between the unique identification for each data point and a correction value, the correction value correcting for errors in the deviation; and
wherein said calculating the numeric value for each data point is further based on the correction value.

18. The method of claim 16, wherein the method further comprises removing a leading empty byte from each of the data points.

19. The method of claim 16, wherein retrieving data from the translation, deviation, cluster and reference tables comprises decrypting the data from the translation, deviation, cluster and reference tables.

20. A database management system for storing an anonymised data item in a computing device memory, the system comprising:
a plurality of data stores for storing one or more data entries;
a processing device; and
a computer-readable medium connected to the processing device configured to store instructions that, when executed by the processing device, performs the operations of:
obtaining a set of data points, wherein each data point is defined by a numeric value, and wherein the set of data points defines a representation of the data item;
assigning an index value to each of the plurality of data points, the index value representing a position of the data point in the representation of the input data item;
clustering the data points into one or more clusters;
determining a deviation of each data point from a reference data point of its respective cluster;

generating a unique identification for each data point;
generating one or more entries for a translation table mapping the unique identification for each data point to the corresponding index value;
generating one or more entries for a deviation table mapping the unique identification for each data point to the corresponding deviation;
generating one or more entries for a cluster table mapping the unique identification for each data point to its corresponding cluster;
generating one or more entries for a reference table comprising the reference data points of each of the one or more clusters, the reference table mapping the reference data points to the corresponding unique identification; and
storing the one or more entries for the translation, deviation, cluster and reference tables on the plurality of data stores.

* * * * *